March 4, 1958     J. E. LIDIAK     2,825,851
CONTROL CIRCUIT

Filed March 31, 1955     2 Sheets-Sheet 1

INVENTOR.
JOSEPH E. LIDIAK
BY
ATTORNEY

March 4, 1958   J. E. LIDIAK   2,825,851
CONTROL CIRCUIT

Filed March 31, 1955   2 Sheets-Sheet 2

INVENTOR.
JOSEPH E. LIDIAK
BY
ATTORNEY

United States Patent Office 2,825,851
Patented Mar. 4, 1958

2,825,851

CONTROL CIRCUIT

Joseph E. Lidiak, Levittown, Pa., assignor to Philco Corporation, Philadelphia, Pa., a corporation of Pennsylvania Application March 31, 1955, Serial No. 498,256

8 Claims. (Cl. 315—83)

This invention relates generally to electromechanical control circuits and more particularly to automatic vehicle headlight dimmer control systems.

Each of the two headlights of vehicles such as automobiles has two filaments, a high beam filament and a low beam filament. Energization of the high beam filaments will produce what is commonly referred to as the high beams or bright lights. Energization of the low beam filaments will produce what is commonly referred to as the low beams or the dim lights.

For many years operators of vehicles such as automobiles have been confronted with the problem of glare produced by the high beams of the headlights of oncoming vehicles. Ordinarily the operator of a vehicle will dim his lights as he approaches oncoming traffic and presumably the operators of the oncoming vehicles will also dim their headlights. This has been accomplished by a conventional single pole double throw dimmer footswitch operable by a button which, when depressed by the operator, will alternately complete circuits for the high beam filaments and low beam filaments of the headlights. However, due to carelessness, forgetfulness or other reasons the operator will often fail to dim his lights as he approaches oncoming traffic. This is particularly true in many cases when an operator is entering a lighted area such as a city. Moreover, under certain traffic conditions, the operator of a vehicle is required to operate the footswitch frequently to regulate his headlights properly. In order to relieve the operator of the necessity of frequent operation of the dimmer footswitch and to regulate the headlights properly, devices have been developed which automatically energize the high beam filaments or the low beam filaments in accordance with particular light conditions.

These prior art devices are usually comprised of a light sensitive device constructed to be responsive to the intensity of the light impinging thereon to produce a signal whose magnitude varies in accordance with the intensity of the light. Automatic control circuit means are constructed to be responsive to the signal from said light sensitive device to energize selectively either the high beam filaments or the low beam filaments in accordance with the intensity of light.

In addition to the energization of the high and low beam filaments by means of the automatic control circuit, it is desirable to have means provided which function to enable the operator to override manually the automatic control circuit to change from high beams to low beams, hereinafter referred to as override to low beams, or to override manually the automatic control circuit to change from low beams to high beams, hereinafter referred to as override to high beams.

Preferably this should be accomplished with as few manual controls as possible. Most of the prior art devices have a footswitch which has an automatic position and an override position. However, many of these devices only have override to either low beams or high beams but not to both low beams and high beams. The few prior art devices which do provide for manual override to both high beams and low beams have more than one manual control to perform both override functions or have complicated control circuits utilizing at least three relays and which are relatively expensive. It can be seen that, from the viewpoint of the operator of the automobile, the most desirable arrangement is one in which a single manual control performs the function of switching the headlight filaments to automatic operation and which also performs the functions of overriding to low beams and overriding to high beams by means of a relatively inexpensive circuit arrangement.

It is an object of the present invention to provide a relatively simple and inexpensive automatic headlight dimmer control system in which a single conventional type footswitch performs the function of placing the high and low beams under automatic control and also performs the functions of manually overriding to low beam from automatic high beam control and manually overriding to high beam from automatic low beam control.

Another object of the invention is to provide an automatic headlight dimmer control system using a single conventional type footswitch both for automatic operation and for both override functions, and in which only two relays are employed.

Another object of the invention is to provide an automatic headlight dimmer control system in which the beams are independent of the operation of the light sensitive device when the footswitch is in override position.

A further object of the invention is the improvement of automatic headlight dimmers generally.

In accordance with the invention there is provided, in combination with the high and low beam filaments of vehicular headlights, a battery and a switching means which is arranged to supply the battery potential to either an automatic circuit or an override circuit. The automatic circuit comprises a light sensitive means and relay means and is constructed so that, when the potential of the battery is supplied thereto, the automatic circuit will be responsive to the intensity of the light impinging upon said light sensitive means to perform two functions. These functions are to selectively energize either the low beam filaments or the high beam filaments and simultaneously to complete the override circuit from the switching means to the other beam filaments. Means are provided to maintain the said completed override circuit between said switching means and said high beam or low beam filaments when the potential of the battery is switched from the said automatic circuit to the said override circuit by actuation of the switching means.

In accordance with another form of the invention there is provided a battery and a first relay means constructed to supply the potential of said battery selectively to either the high beam filaments or the low beam filaments of the headlights. Energization or de-energization of this first relay means is controlled by an automatic circuit or by an override circuit. Switching means is provided to apply the potential of said battery to either the automatic circuit or the override circuit. The circuit which controls said first relay means is identified as that one to which the potential of said battery is supplied. The automatic circuit is comprised of a light sensitive device and a second relay means operable in response to the output from the light sensitive device to supply the potential of said battery to the winding of said first relay means when certain conditions are met. These conditions are met when the battery potential is supplied to the automatic circuit and when the intensity of light impinging upon the light sensitive device is within a predetermined range. The override circuit is constructed to be responsive to the condition of said second relay means to complete a circuit from said switching means to the winding of said first relay when the second relay is caused to interrupt the supply of the potential of said battery to said first relay means. Means are provided to maintain said completed override circuit when the switching means functions to switch the battery potential from the automatic circuit to the override circuit.

A feature of the invention is that it will operate with either a dark-actuated light sensitive device or a light-actuated light sensitive device. A dark-actuated light sensitive device is defined as one which produces an output signal in the absence of light, whereas a light-actuated light sensitive device is defined as one which produces an output signal in the presence of light.

These and other objects and features of the invention will be more fully understood from the following detailed description thereof when read in conjunction with the drawing in which.

Figure 1:
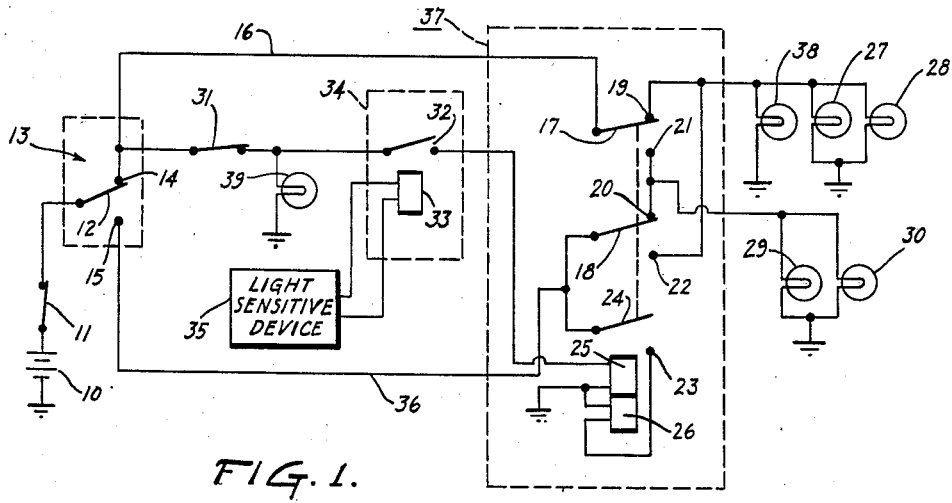
Figure 1 is a schematic sketch of one embodiment of the invention.

Referring now to Figure 1, the battery 10, which may be the automobile storage battery, is connected through the master switch 11, which may be the headlight switch, to the switch arm 12 of the switch 13 which also comprises output terminals or contact points 14 and 15. Switch 13 may be a conventional type headlight dimmer footswitch. The automatic circuit of the device is connected to the contact point 14, and the override circuit is connected to the contact point 15. The conductor 16 connects the contact point 14 to the armature leaf 17 of power relay 37 which also comprises normally closed contacts 19 and 20 associated with armature leaves 17 and 18 respectively, normally open contacts 21, 22 and 23 associated with armature leaves 17, 18 and 24 respectively, actuating winding 25 and hold winding 26.

The armature leaf 17 is in contact with either of the contact points 19 or 21 depending on whether the power relay is in a condition of non-energization or in a condition of energization. Contact point 19 is connected to the high beam filaments 27 and 28, of the automobile headlights and the high beam indicating lamp 38. Contact 21 is connected to the low beam filaments 29 and 30 of the automobile headlights. Thus, when the potential of the battery 10 is applied to the automatic circuit, either the high beam filaments or the low beam filaments will be energized in accordance with the condition of the power relay 37.

The power relay 37 can be energized initially only by means of a circuit extending from the battery 10, through master switch 11, switching arm 12, disabling switch 31, contacts 32 and actuating coil 25 to a point at ground potential. The contacts 32 are normally open in this embodiment of the invention and are actuated to a closed position when the winding 33 of the sensitive relay 34 is energized. Energization of the winding 33 is accomplished by means of a signal from a light sensitive device 35 which is constructed to generate such a signal when the intensity of light reaches a certain predetermined value. It can be seen that, when the sensitive relay 34 is de-energized, the contacts 32 will be opened and the power relay 37 will be de-energized, thus causing armature leaf 17 to be closed on contact 19. When the sensitive relay 34 is energized the contacts 32 will be closed and, assuming the battery 10 is connected to the contact point 14, winding 25 will be energized to cause armature leaf 17 to close on contact 21.

Disabling switch 31 functions, when opened, to completely eliminate automatic operation of the circuit and to condition the circuit of Figure 1 so that the footswitch 13 operates to selectively connect the battery source 10 directly to the high beam filaments or the low beam filaments through contacts 19 or 20 respectively of power relay 37. The lamp 39 is lighted to indicate automatic operation when the potential of the battery 10 is supplied to armature of relay 34.

In the override circuit, the holding coil 26 and the associated circuitry comprising armature leaves 18 and 24 and the associated contact points 20, 22 and 23 are arranged so that, in response to the condition of the automatic circuit, circuits are completed from the contact point 15 of switch 13 to the headlight beam filaments other than those connected to contact point 14 through the automatic circuit. The lead 36 connects the contact point 15 to the armature leaves 18 and 24 of power relay 37. From the drawing it can readily be seen that, when the relay 37 is de-energized, the armature leaf 18 will be connected to the contact point 20 which in turn is connected to the low beam filaments 29 and 30. Under these conditions, and when the arm 12 of switch 13 is closed on contact point 15, the low beam filaments 29 and 30 will be energized. Further, when the power relay 37 is de-energized, the armature leaf 24 and contact 23 will be open so that current cannot flow through the holding coil 26.

The switch 13 is designed to operate rapidly so that the arm 12 thereof can be switched from contact point 14 to contact point 15 without causing opening of the armature of the power relay 37 should said relay 37 be in an energized condition at the time of such a switching. Under these circumstances armature leaves 18 and 24 will close on contact 22 and 23 and a holding circuit for the power relay 37 is established which may be traced from battery source 10 through switch 13, lead 36, armature leaf 24, contact 23, and hold winding 26 to ground. It is to be noted that the hold winding 26 can be energized only if the relay 37 is energized at the time that arm 12 of switch 13 is switched from contact point 14 to contact point 15, since there is no other means by which the holding circuit for winding 26 can be completed after the arm 12 is switched from contact point 14. Further, if the power relay 37 is energized when the arm 12 is switched from contact point 14 to contact point 15, armature leaf 18 is closed upon contact 22 to complete a path from contact point 15 to the high beam filaments 27 and 28, whereas prior to this time the potential of battery 10 is supplied to the low beam filaments 29 and 30 through contact 21 of relay 37. If the power relay 37 is de-energized when the arm 12 is switched from contact point 14 to contact point 15, then the relay 37 will remain de-energized and the battery 10 will be connected to the low beam filaments 29 and 30 through contact 20 of relay 37.

The operation of the circuit of Figure 1 will now be described. Generally speaking, there are four possible conditions of the circuit. The first two are when the footswitch 13 is in either automatic or override position and the sensitive relay 34 is energized in response to a signal output from the light sensitive device 35. The second two conditions are when the footswitch is in either automatic or override position and the sensitive relay 34 is not energized. Consider first the case where the light impinging upon the light sensitive device 35 is of sufficient intensity to produce a signal whereby the winding 33 of the sensitive relay is energized, thus closing the contacts 32. Assume the arm 12 of the footswitch 13 to be closed on contact 14. The winding 25 of power relay 37 will thereby be energized in a circuit which can be traced from the battery 10 through switch 11, arm 12, disabling switch 31 (which is assumed to be closed), closed contacts 32, and the winding 25 to ground potential. Energization of winding 25 will close armature leaves 17, 18 and 24 upon the contacts 21, 22 and 23 respectively. Closure of armature leaf 17 upon contact 21 will result in energization of the low beam filaments 29 and 30 by applying the potential of battery 10 thereto through conductor 16 and contact 21.

At this time there is no current flow through the armature leaves 18 and 24. If now the arm 12 is caused to close on contact 15, there will be a current flow which can be traced from the battery source 10, through arm 12, lead 36, armature leaf 18 and contact 22 to the high beam filaments 27 and 28, thus energizing said high beam filaments. The armature leaves 18 and 24 will remain closed on contacts 22 and 23 respectively because of the holding circuit for hold coil 26 which can be traced from lead 36 through armature leaf 24, contact 23, and hold coil 26 to ground potential. As stated hereinbefore, the switch 13 is designed so that it will move from the contact 14 to the contact 15 before the relay 37 becomes de-energized to a point where the normally open contacts 21, 22 and 23 are opened. Thus it can be seen that switching the footswitch from the automatic circuit to the override circuit, when the sensitive relay 34 is energized, will change the headlights from low beam to high beam.

Assume now that the arm 12 of switch 13 is closed on contact point 14 and that the intensity of the light impinging on the light sensitive device 35 is insufficient to produce a large enough output signal to operate the sensitive relay 34. Consequently the contacts 32 will be open and the close coil 25 of the power relay 37 will be de-energized.

The armature leaves 17 and 18 of the power relay 37 are closed on the normally closed contacts 19 and 20. A circuit can be traced from the battery 10, through switch 11, arm 12 of switch 13, conductor 16, armature leaf 17, contact 19 to the high beam filaments 27 and 28. Under these conditions it is to be noted that the contacts 21, 22 and 23 are all open.

If the arm 12 of the footswitch 13 is now caused to be switched from contact point 14 to contact point 15 a circuit will be established from battery 10, through switch 11, arm 12 of switch 13, conductor 36, armature leaf 18, contact 20 to the low beam filaments 29 and 30. The holding coil 26 will not be energized since the contact 23 is opened. It can thus be seen that switching the arm 12 of footswitch 13 from the contact point 14 to the contact point 15 when the contacts 32 are open will function to switch the headlights from the high beam filaments to the low beam filaments.

It is to be noted that, if the arm 12 of the footswitch 13 remains closed on contact point 14, the high beam filaments or the low beam filaments will be energized as the contacts 32 of sensitive relay 34 are opened or closed. If the arm 12 of footswitch 13 is closed on contact point 15, the condition of contacts 32 will not affect the headlight beam filaments since the battery source 10 is completely isolated from the contacts 32.

The operator can completely disable the automatic portion of the device by opening the disabling switch 31 which isolates the automatic circuit from the battery source 10. The armature leaves 17 and 18 of power relay 37 will then be closed on contact points 19 and 20, and moving the arm 12 of switch 13 between contact points 14 and 15 will energize the high beam filaments and low beam filaments respectively directly through contacts 19 and 20 of relay 37 regardless of the condition of the contacts 32.

Figure 2:
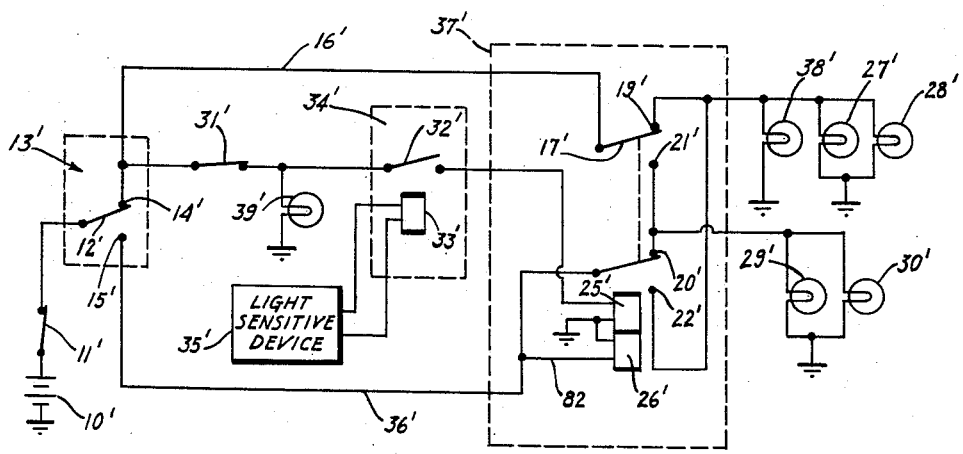
Figure 2 is a schematic sketch of a second embodiment of the invention.

Referring now to Figure 2 there is shown a schematic diagram of a circuit which is similar in many respects to that of Figure 1. All elements of Figure 2 that correspond to elements of Figure 1 have the same reference characters (primed) as the reference characters of their corresponding elements of Figure 1. The only difference between the structure of Figure 1 and the structure of Figure 2 is that in Figure 1 the holding circuit for the winding 26 extends from the conductor 36 through the armature leaf 24 of relay 37, the contact 23 and the winding 26 of relay 37 to ground potential whereas, in the circuit of Figure 2, the holding circuit extends from the conductor 36' through the lead 82 and the winding 26' of power relay 37' to a point at ground potential. In Figure 2 there are no circuit elements corresponding to the armature leaf 24 and the contact 23 of Figure 1. It will be noted that in Figure 1 the holding circuit for hold winding 26 will not be completed unless the relay 37 is already operated and the armature leaf 24' is thereby closed on the contact 23 whereas, in the structure of Figure 2, the holding circuit for the winding 26' is a direct connection from contact point 15' of switch 13' through the conductor 36' and conductor 82. As will be seen more clearly later herein, it is necessary for proper operation of the circuit that the holding coil 26' have no effect on the relay armature unless the relay 37 is already energized by the winding 25. In the circuit of Figure 1 this requirement is assured since contact 23, which is part of the holding circuit of winding 26, will be open unless the relay 37 is operated. In the circuit of Figure 2 this requirement can be met only by carefully designing the relay 37' so that it will not operate when the maximum potential of battery 10' is applied across the winding 26'. This maximum potential is about 8 volts in most nominally 6 volt vehicles. Further both the relay 37 of Figure 1 and the relay 37' of Figure 2 must be designed so that, when energized, a potential of 3 volts across their respective hold windings 26 and 26' will maintain the associated relay in an energized condition.

The operation of the circuit of Figure 2 is the same as that of Figure 1 except for the following differences. Assume that the arm 12' of footswitch 13' is switched from the contact point 14' to the contact point 15' at a time when the relay 37' is not energized. A circuit may then be traced from battery 10' through arm 12' of switch 13', lead 36', lead 82 and winding 26' to a point at ground potential. However, the relay 37' will not become actuated since less than 8 volts are impressed across the winding 26'. This over-all result is the same as obtained by the circuit of Figure 1. Assume now that the arm 12' of switch 13' is closed on contact 15' when the relay 37' is energized. A circuit can be traced from battery 10' through conductors 36' and 82, and through winding 26' to ground potential. Since the potential thus impressed across the winding 26' is more than 3 volts, the relay 37' will be maintained in an energized condition. The same result will be obtained with the circuit of Figure 1 as described hereinbefore.

Figure 3:
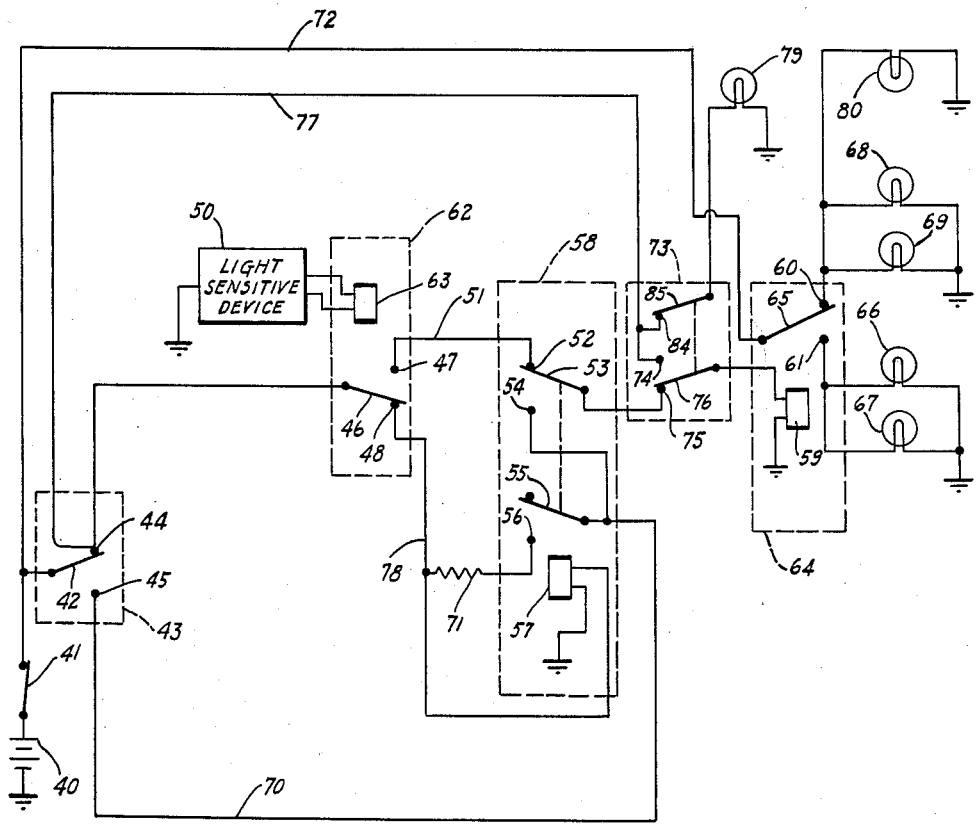
Figure 3 is a schematic sketch of a third embodiment of the invention.

Referring now to Figure 3 the battery 40, which may be the automobile battery, is connected to the armature leaf 65 of relay 64 through the master switch 41 and the lead 72, and is also connected to the arm 42 of the switch 43 through the master switch 41. Depending on whether the relay 64 is de-energized or energized, the armature leaf 65 will be closed on either normally closed contact 60 or normally open contact 61 to supply the battery potential to either the high beam filaments 68 and 69 and high beam indicating lamp 80, or the low beam filaments 66 and 67 respectively. Energization of the relay 64 is controlled by circuit means which consists of an automatic portion and an override portion.

The automatic portion of the circuit may be divided into two parts. The first of these parts is constructed to determine which of the headlight filaments will be energized when the circuit is in automatic condition. The second of these parts is constructed to prepare the override circuit so that, when the arm 42 of the footswitch 43 is switched from contact 44 to contact 45, the headlight filaments will also be switched. In the first part of the automatic circuit, the light sensitive device 50 is constructed to be responsive to a predetermined intensity of light to produce a signal which will energize the winding 63 of the sensitive relay 62 to close the armature leaf 46 on the contact 47. When the relay 62 is energized, and when the arm 42 of footswitch 43 is closed on the contact 44, a completed circuit can be traced from battery 40, through switch 41, arm 42 of switch 43, contact point 44, armature leaf 46 of relay 62, contact 47, lead 51, contact 52 of relay 58, armature leaf 53, switch 73 and through the winding 59 of the relay 64 to ground potential. Relay 64 operates when energized to close the armature 65 upon the contact 61, thus connecting the battery 40 to the low beam filaments 66 and 67 through the lead 72.

When the relay 62 is de-energized the armature leaf 46 will be closed on the normally closed contact 48 to interrupt the energizing circuit for relay 64 and to connect the contact point 44 to the second part of the automatic circuit. This second part of the automatic circuit includes the winding 57 of relay 58 and performs the function of preparing the override circuit which comprises conductor 70, contact 54, and armature leaf 53.

Assuming that the arm 42 of the footswitch 43 is closed on contact point 44, the winding 57 of the relay 58 will become energized when the contact 48 is closed. When relay 58 is energized the armature leaves 53 and 55 will be closed on contacts 54 and 56, respectively, and two completed circuits will be established from the contact point 45. One of these circuits is a holding circuit which extends from the contact point 45, through the lead 70, armature leaf 55, contact 56, resistor 71 and winding 57 to ground potential. This holding circuit maintains the relay 58 in an energized condition when the arm 42 of switch 43 is switched from contact point 44 to contact point 45. The other circuit, which is the override circuit, extends from the contact point 45 through the lead 70, contact point 54, armature leaf 53, switch 73 and the winding 59 of relay 64 to ground potential. If the relay 58 is in a de-energized condition when the arm 42 of switch 43 is switched from contact point 44 to contact point 45, no completed circuits exist from the contact point 45 to either the winding 57 of relay 58 or the winding 59 of relay 64.

It is to be observed from the above description that, if the relay 64 is initially energized through the automatic circuit, the override circuit is conditioned so that, when the arm 42 of switch 43 is switched from contact point 45 to contact point 44, the relay 64 will become de-energized. If the relay 64 is not initially energized, then, when the arm 42 is switched from contact point 44 to contact point 45, the override circuit will form a completed path from the battery 40 to energize the relay 64.

The resistor 71 performs a current limiting function in the circuit as well as forming a portion of the holding circuit for the relay 58. The current limiting function occurs when the relay 58 is energized through the contact 48 of sensitive relay 62. A completed circuit then exists from the battery 40, through the contact point 44 of switch 43, contact 48 of relay 62, resistance 71, contact 56, armature leaf 55, contact 54, armature leaf 53, switch 73, and the winding 59 of relay 64 to a point at ground potential. However relay 64 will not operate due to the current limiting action of resistance 71.

The disabling switch 73 performs the function of completely isolating the relay 64 from the effect of the automatic circuit. When the arm 76 of switch 73 is switched from the contact point 75 to the contact point 74, the winding 59 of relay 64 is connected directly to the contact point 44 of the switch 43 through the lead 77 which shunts the automatic circuit. If the arm 42 of the switch 43 is now closed on the contact point 44, the relay 64 will be energized through lead 77. If the arm 42 of the switch 43 is closed on the contact point 45, the relay 64 will be de-energized since contact 54 of relay 58 is open.

Indicator lamp 79 is connected to the switch arm 85 of the disabling switch 73 and becomes lighted when the circuit is in automatic operation. This occurs when the arm 42 of the footswitch 43 is connected to the contact point 44 and when the armature leaves 85 and 76 of switch 73 are closed on contacts 84 and 75 respectively. Lamp 80 is connected in parallel with the high beam filaments 68 and 69 and functions to indicate energization of the high beam filaments 68 and 69.

The operation of this circuit will now be described.

There are four different conditions of operation which will be described separately. The first two conditions of operation are when the footswitch is in either automatic or override position and the sensitive relay 62 is de-energized, and the second two conditions of operation are when the footswitch is in either automatic or override condition and the sensitive relay 62 is energized.

Automatic operation with the sensitive relay 62 de-energized (high beam filaments energized) will be considered first. Assume the master switch 41 to be closed and the arm 42 of switch 43 closed on the contact point 44. Further assume that the intensity of light impinging on the light sensitive device 50 is insufficient to produce a signal that will actuate the sensitive relay 62. Consequently the armature leaf 46 thereof will be closed on the normally closed contact 48. The relay 64 will be de-energized because of the open contact 47 of the relay 62. The high beam filaments 68 and 69 will now be energized in a circuit extending from the battery 40, through the master switch 41, conductor 72, armature leaf 65 of relay 64, contact 60, and through the high beam filaments 68 and 69 to ground potential. Further, the automatic indicating lamp 79 and the high beam indicator lamp 80 will be lighted in a circuit extending from battery 40 through arm 42 and contact point 44 of switch 43, conductor 77, and contact point 84 and armature leaf 85 of switch 73.

Relay 58 will be energized through a circuit extending from battery 40, master switch 41, arm 42 of footswitch 43, armature leaf 46 of sensitive relay 62, contact 48, lead 78, and through the winding 57 of relay 58 to ground potential. Armature leaves 53 and 55 are thereby closed on normally open contacts 54 and 56. Assume now that the arm 42 of the footswitch 43 is switched from contact point 44 to contact point 45. The operation of the switch 42 is so rapid that the relay 58 will remain energized during the switching operation and will remain energized thereafter by means of the holding circuit extending from battery 40, through master switch 41, arm 42 of switch 43, contact point 45, lead 70, armature leaf 55, resistor 71, and through the winding 57 to ground potential.

At this time the battery 40 is also connected through conductor 70, contact 54 of relay 58, armature leaf 53, switch 73, and through the winding 59 of relay 64 to ground potential, thereby operating the relay 64 and closing armature leaf 65 on the contact 61. The high beam filaments 68 and 69 and the high beam indicator lamp 80 are thus de-energized and the low beam filaments 66 and 67 are energized.

Automatic operation with the sensitive relay 62 energized (low beam filaments 66 and 67 energized) will now be described. Assume the arm 42 of switch 43 to be closed on contact point 44. Assume also that the intensity of light impinging on the light sensitive device 50 is above a predetermined level so that the signal produced by the device 50 will actuate the sensitive relay 62 to close the normally open contact 47. A complete circuit can then be traced from the battery source 40, through the master switch 41, the arm 42 of the footswitch 43, the armature leaf 46 of the sensitive relay 62, normally open contact 47, lead 51, armature leaf 53 of relay 58, switch 73, and through the winding 59 of relay 64 to ground potential. Relay 64 is thereby energized and the armature leaf 65 is closed on the contact 61, thus energizing the low beam filaments 66 and 67 through the lead 72. Since the contact 48 of sensitive relay 62 is open the relay 58 is de-energized and the normally open contacts 54 and 56 of relay 58 are open.

If the arm 42 of footswitch 43 is switched from contact point 44 to contact point 45, the relay 64 will be caused to be de-energized since the battery source 40 is connected only to lead 70 which is open circuited at contact 54 of relay 58. De-energization of relay 64 will permit the normally closed contact 60 to become closed, thus completing a circuit from the battery 40 to the high beam filaments 68 and 69 through conductor 72 and contact 60 of relay 64.

It is to be noted that, when the arm 42 of switch 43 remains in automatic position and the master switch 41 is closed, either the high beam filaments 68 and 69 or the low beam filaments 66 and 67 will be energized depending on whether relay 62 is de-energized or energized.

The operator of the vehicle can disable the automatic portion of the circuit by moving arm 76 of the disabling switch 73 from contact 75 to contact 74 and arm 85 from contact 84, thus completely isolating the effect of relay 62 and relay 58 from the operation of the circuit and removing all connection to lamp 79. Operation of the switch 43 will now be entirely manual in that if the arm 42 thereof is caused to close on contact point 44, the relay 64 will be energized through lead 77 to cause energization of the low beam filaments through lead 72. If the arm 42 is closed on contact point 45, the relay 64 will always be de-energized, thus causing energization of the high beam filaments through lead 72.

It is to be noted that the forms of the invention herein shown and described are but preferred embodiments of the same and that various changes may be made in circuit constants and circuit arrangement without departing from the scope of the invention.

I claim:

1. In a system for controlling energization of high and low beam filaments of vehicular headlights, a relay having actuating and holding windings and having first and second double-throw contact means, a source of electrical energy, a single-pole double-throw manual switch having a single movable contact and having first and second stationary contacts selectively engageable by said movable contact, means for connecting said source to said movable contact, a first circuit means connected to said first stationary contact and controllable by the first contact means of said relay for selectively energizing the high and low beam filaments, a second circuit means extending from said first stationary contact to said actuating winding, means including a light-sensitive device for controlling said second circuit means so as to control the energization of said actuating winding according to light received by said device, a third circuit means connected to said second stationary contact and controllable by the second means of said relay for selectively energizing the high and low beam filaments, and means for connecting said holding winding to said third circuit means for energization of the holding winding over said third circuit means.

2. A system according to claim 1, wherein the means for controlling said second circuit means includes a relay controlled by said light-sensitive device.

3. A system according to claim 1, including a manual switch in said second circuit means for opening the latter to prevent energization of said relay under control of said light-sensitive device.

4. A system according to claim 1, wherein said relay includes additional contact means through which said holding winding is connectable to said third circuit means.

5. A system according to claim 1, wherein said holding winding is connected directly and permanently to said third circuit means.

6. In a system for controlling energization of high and low beam filaments of vehicular headlights, a first relay having an actuating winding and double-throw contact means, a source of electrical energy, a first circuit means extending between said source and said contact means for selective energization of the high and low beam filaments under control of said relay, a single-pole double-throw manual switch having a single movable contact and having first and second stationary contacts selectively engageable by said movable contact, means for connecting said source to said movable contact, a second circuit means extending from said first stationary contact to said actuating winding, a second relay for controlling said second circuit means, a light-sensitive device for controlling said second relay so as to control energization of said first relay according to light received by said device, a third circuit means connected to said second stationary contact, and a third relay controlled by said second relay for connecting said third circuit means to the actuating winding of said first relay.

7. A system according to claim 6, including a fourth circuit means connected to said first stationary contact, and a double-throw manual switch operable at will to prevent energization of said first relay by said second and third circuit means and to connect the actuating winding of said first relay to said fourth circuit means.

8. In a system for controlling energization of high and low beam filaments of vehicular headlights, a relay having an actuating winding and having first and second double-throw contact means, a source of electrical energy, a single-pole double-throw manual switch having a single movable contact and having first and second stationary contacts selectively engageable by said movable contact, means for connecting said source to said movable contact, a first circuit means connected to said first stationary contact and controllable by the first contact means of said relay for selectively energizing the high and low beam filaments, a second circuit means extending from said first stationary contact to said actuating winding, means including a light-sensitive device for controlling said second circuit means so as to control the energization of said actuating winding according to light received by said device, a third circuit means connected to said second stationary contact and controllable by the second contact means of said relay for selectively energizing the high and low beam filaments, and means for effecting hold-in of said relay over said third circuit means.

References Cited in the file of this patent

UNITED STATES PATENTS

| | | |
|---|---|---|
| 2,431,394 | Friedman | Nov. 25, 1947 |
| 2,679,616 | Onksen et al. | May 25, 1954 |
| 2,686,277 | Bordewieck et al. | Aug. 10, 1954 |

UNITED STATES PATENT OFFICE

CERTIFICATE OF CORRECTION

Patent No. 2,825,851                                             March 4, 1958

Joseph E. Lidiak

It is hereby certified that error appears in the printed specification of the above numbered patent requiring correction and that the said Letters Patent should read as corrected below.

Column 9, line 47, for "second means" read -- second contact means --.

Signed and sealed this 29th day of September 1959.

(SEAL)
Attest:

KARL H. AXLINE                                           ROBERT C. WATSON
Attesting Officer                                      Commissioner of Patents